US009124123B2

(12) United States Patent
Jung

(10) Patent No.: US 9,124,123 B2
(45) Date of Patent: Sep. 1, 2015

(54) WIRELESS POWER TRANSMITTING APPARATUS AND METHOD

(71) Applicant: Chun-Kil Jung, Seoul (KR)

(72) Inventor: Chun-Kil Jung, Seoul (KR)

(73) Assignee: HANRIM POSTECH CO., LTD., Suwon-Si, Gyeonggi-Do (KR)

( * ) Notice: Subject to any disclaimer, the term of this patent is extended or adjusted under 35 U.S.C. 154(b) by 400 days.

(21) Appl. No.: 13/644,379

(22) Filed: Oct. 4, 2012

(65) Prior Publication Data

US 2013/0082652 A1     Apr. 4, 2013

(30) Foreign Application Priority Data

Oct. 4, 2011 (KR) .......................... 10-2011-0100617

(51) Int. Cl.
*H02J 7/00* (2006.01)
*H02J 7/02* (2006.01)

(52) U.S. Cl.
CPC ............... *H02J 7/025* (2013.01); *H02J 7/0004* (2013.01); *H02J 7/0013* (2013.01); *H02J 7/0027* (2013.01)

(58) Field of Classification Search
CPC ...................................................... H02J 7/0004
USPC ........................................................ 320/108
See application file for complete search history.

(56) References Cited

U.S. PATENT DOCUMENTS

| 8,830,036 B2* | 9/2014 | Park et al. ................. 340/10.34 |
| 2004/0145342 A1 | 7/2004 | Lyon ............................. 320/108 |
| 2010/0253281 A1 | 10/2010 | Li .................................. 320/108 |
| 2011/0140538 A1 | 6/2011 | Jung et al. .................... 307/104 |

FOREIGN PATENT DOCUMENTS

WO     WO 2009/038789 A1     3/2009

OTHER PUBLICATIONS

European Search Report issued by the European Patent Office, dated May 7, 2013 for the corresponding European Patent Application No. 12187305.3.

* cited by examiner

*Primary Examiner* — Jack Chiang
*Assistant Examiner* — Brandon Bowers
(74) *Attorney, Agent, or Firm* — STEIN IP LLC

(57) ABSTRACT

Disclosed herein is a wireless power transmitting apparatus and method of wirelessly a power sequentially to a plurality of power receiving apparatuses. According to the wireless power transmitting apparatus and method, a power is wirelessly transmitted through a plurality of power transmitting coils, and a power transmitting control unit performs a control to allocate priorities to the plurality of power receiving apparatuses charged with the power transmitted by the power transmitting coils by judging whether or not the plurality of power receiving apparatuses have been mounted in portable terminals and charged states of the plurality of power receiving apparatuses in the case in which the number of power receiving apparatuses is plural and sequentially transmit the power to the plurality of power receiving apparatuses according to the allocated priorities to charge the power in the plurality of power receiving apparatuses.

9 Claims, 4 Drawing Sheets

WIRELESS POWER TRANSMITTING APPARATUS AND METHOD

CROSS-REFERENCE TO RELATED APPLICATIONS

This application claims the benefit of Korean Application No. 10-2011-0100617, filed Oct. 4, 2011, in the Korean Intellectual Property Office, entitled "Wireless Power Transmitting Apparatus and Method THE SAME", the disclosure of which is incorporated herein by reference.

BACKGROUND OF THE INVENTION

1. Field of the Invention

The present invention relates to a wireless power transmitting apparatus and method of allocating priorities to a plurality of power receiving apparatuses and automatically transmitting sequentially power to the plurality of power receiving apparatuses according to the allocated priorities without movement of a power transmitting coil or an additional operation of a user to charge the plurality of power receiving apparatuses.

2. Description of the Related Art

Generally, various portable terminals such as a cellular phone, a personal digital assistant (PDA), and the like, have been mounted with a power receiving apparatus charged with a power to supply an operation power thereto. The power receiving apparatus may be charged with a power supplied from an external charging apparatus and supplies the charged power as the operation power to the portable terminal to operate the portable terminal.

The power receiving apparatus may include a battery cell module charged with the power, a charging and discharging circuit charge the power supplied from the external charging apparatus in the battery cell module and discharging the charged power to supply the discharged power to the portable terminal, and the like.

As a scheme of electrically connecting the charging apparatus to the power receiving apparatus, a terminal connection scheme of directly connecting a terminal through which the power is output in the charging apparatus to a terminal to which the power is input in the power receiving apparatus through a cable has been known.

In the terminal connection scheme, the terminal of the charging apparatus and the terminal of the power receiving apparatus have the different potential difference. Therefore, in the case in which the terminal of the charging apparatus and the terminal of the power receiving apparatus are connected to each other or disconnected from each other, an instantaneous discharging phenomenon may occur.

This instantaneous discharging phenomenon causes abrasion of the terminal of the charging apparatus and the terminal of the power receiving apparatus. In addition, in the case in which foreign materials are accumulated in the terminal of the charging apparatus and the terminal of the power receiving apparatus, when the instantaneous discharging phenomenon occurs, the heat may occur in the foreign materials, so there is a risk that an accident such as a fire, or the like, will occur.

In addition, the power charged in the battery cell module charged in the power receiving apparatus is naturally discharged to the outside through the terminal of the power receiving apparatus due to moisture, or the like, so a lifespan of the power receiving apparatus may be decreased and performance of the power receiving apparatus may be deteriorated.

Recently, a wireless power transmitting apparatus wirelessly transmitting the power to the power receiving apparatus has been suggested in order to solve several problems of the terminal connection scheme as described above.

The wireless power transmitting apparatus wirelessly transmits the power in, for example, an electromagnetic induction scheme. In addition, the power receiving apparatus receives the power wirelessly transmitted by the wireless power transmitting apparatus and charges the received power in the battery cell module.

A number of efforts have been conducted in order for the wireless power transmitting apparatus to wirelessly transmit the power stably at high efficiency and in order for the power receiving apparatus to receive the power transmitted by the wireless power transmitting apparatus as much as possible to charge the power in the battery cell module.

There is a case in which a plurality of power receiving apparatuses are seated and charged on a charging station of the wireless power transmitting apparatus. In this case, the power may be transmitted to all of the plurality of power receiving apparatuses through a plurality of power transmitting coils to thereby be simultaneously charged in all of the plurality of power receiving apparatuses.

However, it is very inefficient to transmit the power to all of the plurality of power receiving apparatuses through the plurality of power transmitting coils since the power is transmitted without distinguishing a power receiving apparatus required to be urgently charged. In addition, it takes a more time to charge the power in the case in which the power is transmitted to all of the plurality of power receiving apparatuses through the plurality of power transmitting coils as compared with the case in which the power is sequentially supplied to and charged in the plurality of power receiving apparatuses one by one.

Further, in Japanese Patent Laid-Open Publication No. 2009-273327, a moving unit moving the power transmitting coil is provided under the charging station and allows the power to be transmitted to and charged in the power receiving apparatuses while sequentially moving the power transmitting coil to positions at which the power receiving apparatuses are put.

That is, in the case in which first and second power receiving apparatuses are put at first and second positions of the charging station, respectively, the moving unit moves the power transmitting coil to the first position to charge the power in the first power receiving apparatus. Further, in the case in which the charging of the first power receiving apparatus is completed, the moving unit moves the power transmitting coil to the second position to charge the power in the second power receiving apparatus.

However, even in Japanese Patent Laid-Open Publication No. 2009-273327 described above, the power is transmitted without distinguishing the power receiving apparatus required to be urgently charged, which is very inefficient, and a separate moving unit should be provided in the charging station. In addition, a separate moving control unit, or the like, should be provided in order to control that the moving unit moves the power transmitting coil.

SUMMARY OF THE INVENTION

An object of the present invention is to provide a wireless power transmitting apparatus and method of determining priorities by a predetermined reference in the case in which a plurality of power receiving apparatuses are put on one charging station simultaneously or at different times and sequentially transmitting a power to each of the plurality of power receiving apparatuses according to the determined priorities to charge the power in each of the plurality of power receiving apparatuses.

Another object of the present invention is to provide a wireless power transmitting apparatus and method of judging power amounts charged in battery cell modules of each of a plurality of power receiving apparatuses put on a charging station to determined priorities and sequentially supplying a power to each of the plurality of power receiving apparatuses according to the determined priorities to charge the power in each of the plurality of power receiving apparatuses.

Objects of the present invention are not limited to the above-mentioned objects. That is, other objects that are not mentioned may be obviously understood by those skilled in the art to which the present invention pertains from the following description.

According to a wireless power transmitting apparatus and method of the present invention, in the case in which the number of power receiving apparatuses in which a power should be charged is plural, priorities of the plurality of power receiving apparatuses are judged.

The priorities are allocated in a scheme in which a first priority is allocated to a power receiving apparatus that is mounted in a portable terminal and a second priority is allocated to a power receiving apparatus that is not mounted in the portable terminal.

In addition, in the case in which the priorities according to whether or not the power receiving apparatuses are mounted in the portable terminals are the same as each other, the priorities are determined according to power charged states of the power receiving apparatuses.

When the priorities are determined, the power is transmitted to a power receiving apparatus having a high priority to thereby be charged therein and is transmitted to a power receiving apparatus having the next priority to thereby be charged therein in the case in which the charging of the power in the power receiving apparatus having the high priority is completed.

According to an exemplary embodiment of the present invention, there is provided a wireless power transmitting apparatus including: a power transmitting unit configured to wirelessly transmit a power through a plurality of power transmitting coils; and a power transmitting control unit configured to perform a control to judge priorities of a plurality of power receiving apparatuses charged with the power transmitted by the power transmitting unit in the case in which the number of power receiving apparatuses is plural, sequentially select the plurality of power receiving apparatuses one by one according to the judged priorities, and transmit the power to the selected power receiving apparatuses.

The power transmitting unit may include: a signal transmitting unit configured to generate information request signals requesting an information of an identifications (IDs) of the plurality of power receiving apparatuses, whether or not the plurality of power receiving apparatuses are mounted in portable terminals, and power charged states under the control of the power transmitting control unit and transmit the information request signals to the plurality of power receiving apparatuses; and a signal receiving unit configured to receive information signals transmitted by the power receiving apparatuses according to the information request signals and provide the information signals to the power transmitting control unit.

The transmission of the information request signals and the reception of the information signals may be performed through the plurality of power transmitting coils.

The priorities may be allocated in a scheme in which a first priority is allocated to the power receiving apparatus that is mounted in the portable terminal and a second priority is allocated to the power receiving apparatus that is not mounted in the portable terminal.

In the case in which the priorities according to whether or not the power receiving apparatuses are mounted in the portable terminals are the same as each other, the priorities may be determined according to the power charged states of the power receiving apparatuses.

The power transmitting unit may include: a driving driver configured to generate a driving signal that is to detect a variation in a load and a driving signal that is to transmit under the control of the power transmitting control unit; and a series resonant converter configured to switch a direct current (DC) power according to the driving signal to output the switched DC power to the plurality of power transmitting coils.

The power transmitting unit may include: a switching driving unit configured to generate a switching driving signal under the control of the power transmitting control unit; and a plurality of switches each provided between the series resonant converter and the plurality of power transmitting coils and configured to be switched the switching driving signal.

According to another exemplary embodiment of the present invention, there is provided a wireless power transmitting method including: generating, in a signal transmitting unit, information request signals requesting an information of an identifications (IDs) of power receiving apparatuses, whether or not the power receiving apparatus are mounted in portable terminals, and power charged states under a control of a power transmitting control unit in the case in which loads of a plurality of power transmitting coils are varied to transmit the information request signals to the power receiving apparatuses and receiving information signals according to the information request signals from the power receiving apparatuses; judging, in the power transmitting control unit, priorities using the information signals in the case in which the number of power receiving apparatuses is plural; and sequentially selecting, in the power transmitting control unit, the plurality of power receiving apparatuses one by one according to the priorities and transmitting the power to the selected power receiving apparatuses.

The priorities may be allocated in a scheme in which a first priority is allocated to the power receiving apparatus that is mounted in the portable terminal and a second priority is allocated to the power receiving apparatus that is not mounted in the portable terminal.

In the case in which the priorities according to whether or not the power receiving apparatuses are mounted in the portable terminals are the same as each other, the priorities may be determined according to the power charged states of the power receiving apparatuses.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
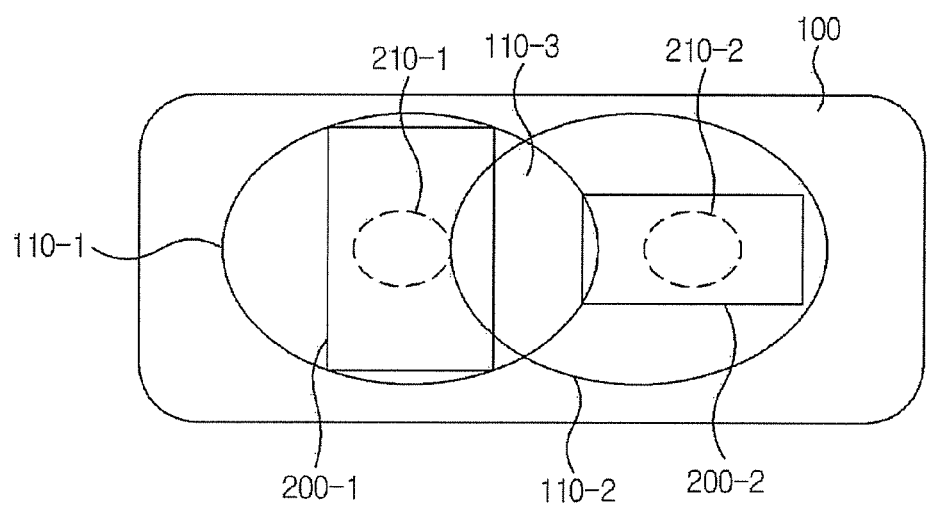
FIG. 1 is a diagram for describing an operation of transmitting a power in a wireless power transmitting apparatus according to an exemplary embodiment of the present invention according to positions of a plurality of power receiving apparatuses put on a charging station of the wireless power transmitting apparatus.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The following detailed description is only an example and only illustrates exemplary embodiments of the present invention. In addition, a principle and a concept of the present invention are provided in order to most usefully and easily describe the present invention.

Therefore, for basic understanding of the present invention, a more detailed structure than necessary will not be provided, and several forms of the present invention that may be executed by those skilled in the art will be illustrated in the accompanying drawings.

FIG. 1 is a diagram for describing an operation of transmitting a power in a wireless power transmitting apparatus according to an exemplary embodiment of the present invention according to positions of a plurality of power receiving apparatuses put on a charging station of the wireless power transmitting apparatus. In FIG. 1, a reference numeral 100 indicates a charging station. The charging station 100 includes, for example, first and second power transmitting coils 110-1 and 110-2 disposed thereon to wirelessly transmit a power.

The first and second power transmitting coils 110-1 and 110-2 may be disposed to have an overlapped region 110-3 at which they are partially overlapped with each other.

In the case in one power receiving apparatus 200 is put on the charging station 100, a user generally puts one power receiving apparatus 200 at the center of the charging station 100.

In this case, a power receiving coil 210; 210-1 and 210-2 of the power receiving apparatus 200; 200-1 and 200-2 is positioned on the overlapped region 110-3 at which the first and second power transmitting coils 110-1 and 110-2 are overlapped with each other.

When the power receiving coil 210; 210-1 and 210-2 of the power receiving apparatus 200; 200-1 and 200-2 are positioned on the overlapped region 110-3 at which the first and second power transmitting coils 110-1 and 110-2 are overlapped with each other, the wireless power transmitting apparatus detects that the power receiving apparatus 200; 200-1 and 200-2 are positioned on the overlapped region 110-3.

In addition, the wireless power transmitting apparatus supplies and transmits the power to the first and second power transmitting coils 110-1 and 110-2, and the power receiving coil 210 of one power receiving apparatus 200 receives the transmitted power and charges the received power in a battery cell module embedded therein.

There is a case in which the user is to put two power receiving apparatuses 200-1 and 200-2 on the charging station 100 to charge the power in both of the two power receiving apparatuses 200-1 and 200-2.

In the case in which the two power receiving apparatuses 200-1 and 200-2 are put on the charging station 100, the power receiving coils 210-1 and 210-2 each embedded in the two power receiving apparatuses 200-1 and 200-2 are generally positioned on the first and second power transmitting coils 110-1 and 110-2.

The two power receiving apparatuses 200-1 and 200-2 may be put on the charging station 100 in the state in which they are mounted in portable terminals or be put on the charging station 100 in the state in which they are not mounted in the portable terminals.

In this case, when the wireless power transmitting apparatus transmits the power through both of the first and second power transmitting coils 110-1 and 110-2, both of the two power receiving apparatuses 200-1 and 200-2 receive the power to charge the power in the battery cell modules.

However, when the wireless power transmitting apparatus transmits the power to the two power receiving apparatuses 200-1 and 200-2 through the first and second power transmitting coils 110-1 and 110-2, the transmitted power is distributed. Therefore, a large amount of time is required until the two power receiving apparatuses 200-1 and 200-2 are fully charged. In addition, the power may not be first charged in the power receiving apparatus 200-1 or the power receiving apparatus 200-2 required to be urgently charged in the two power receiving apparatuses 200-1 and 200-2.

Therefore, the wireless power transmitting apparatus according to the exemplary embodiment of the present invention judges a current state of a plurality of power receiving apparatuses 200-1 and 200-2, that is, whether or not the power receiving apparatuses 200-1 and 200-2 have been mounted in the portable terminals, and a charged state in which the power is charged in the battery cell modules of the power receiving apparatuses 200-1 and 200-2, in the case in which the plurality of power receiving apparatuses 200-1 and 200-2 are put on the charging station 100.

In addition, the wireless power transmitting apparatus according to the exemplary embodiment of the present invention allocates priorities according to the current state of the two power receiving apparatuses 200-1 and 200-2 and sequentially transmits the power to the two power receiving apparatuses 200-1 and 200-2 according to the allocated priorities to charge the power in the two power receiving apparatuses 200-1 and 200-2.

Figure 2:
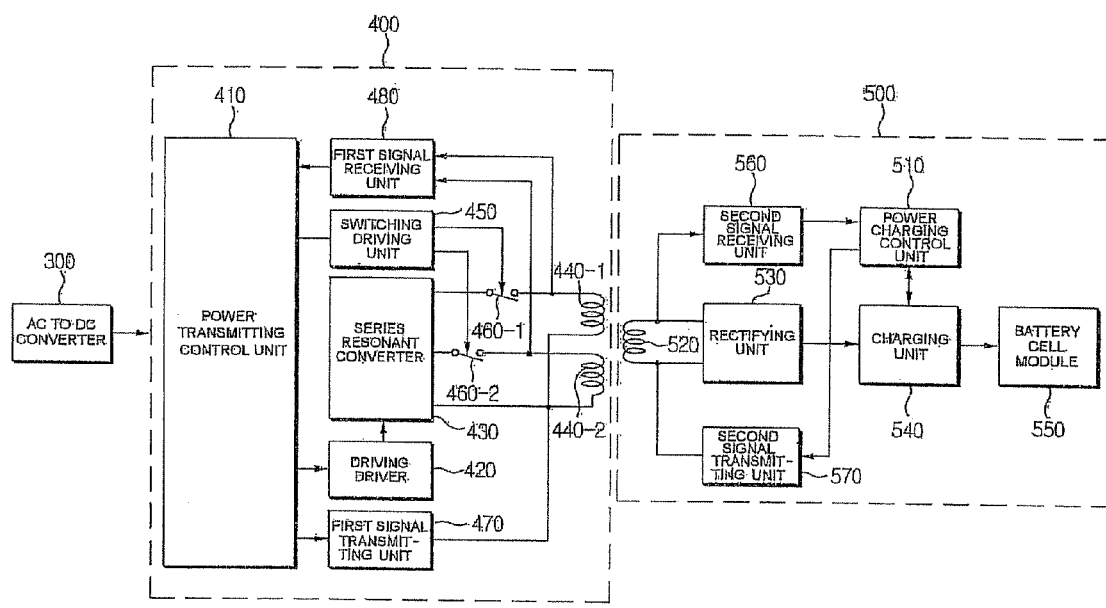
FIG. 2 is a block diagram showing a configuration of the wireless power transmitting apparatus and the power receiving apparatus according to the exemplary embodiment of the present invention.

FIG. 2 is a block diagram showing a configuration of the wireless power transmitting apparatus and the power receiving apparatus according to the exemplary embodiment of the present invention. In FIG. 2, a reference number 300 indicates an alternate current (AC) to direct current (DC) converter. The AC to DC converter 300 converts an AC power input from the outside into a DC power.

A reference numeral 400 indicates the wireless power transmitting apparatus according to the exemplary embodiment of the present invention. The wireless power transmitting apparatus 400 switches the DC power converted by the AC to DC converter 300 and wirelessly transmits the switched power in, for example, an electromagnetic induction scheme.

Although the case in which the AC to DC converter 300 is provided separately from the wireless power transmitting apparatus 400 is shown in FIG. 2 by way of example, the AC to DC converter 300 may also be integrated in the wireless power transmitting apparatus 400 in implementing the present invention.

A reference numeral 500 indicates a power receiving apparatus. The power receiving apparatus 500 receives the power wirelessly transmitted by the wireless power transmitting apparatus 400 to thereby be charged with the power and supplies the charged power as an operation power to a portable terminal (not shown).

The wireless power transmitting apparatus 400 may include a power transmitting control unit 410, a driving driver 420, a series resonant converter 430, first and second power transmitting coils 440-1 and 440-2, a switching driving unit 450, a plurality of switches 460-1 and 460-2, a first signal transmitting unit 470, and a first signal receiving unit 480.

The power transmitting control unit 410 performs a control to recognize the power receiving apparatuses 500, judge whether or not a plurality of power receiving apparatuses 500 have been mounted in the portable terminals and a currently charged power amount in the case in which the number of power receiving apparatuses 500 is plural, thereby determining priorities, and sequentially transmit the power to the plurality of power receiving apparatuses 500 according to the determined priorities to charge the power in the plurality of power receiving apparatuses 500.

The driving driver 420 generates a driving signal that is to detect a variation in a load, a driving signal for wirelessly transmitting the power, and the like, under a control of the power transmitting control unit 410.

The series resonant converter 430 switches and outputs a DC power supplied from the AC to DC converter 100 according to the driving signal generated by the driving driver 420.

The plurality of power transmitting coils 440-1 and 440-2 are applied with the signal that is to detect the variation in the load output by the series resonant converter 430 or resonates with the power output by the series resonant converter 430 to wirelessly transmit the power.

The switching driving unit 450 generates a switching driving signal under the control of the power transmitting control unit 410.

The switches 460-1 and 460-2 are provided between the series resonant converter 430 and the plurality of power transmitting coils 440-1 and 440-2, respectively, and are switched according to the switching driving signal generated by the switching driving unit 450.

The first signal transmitting unit 470 generates an information request signal requesting information such as an identification (ID), whether or not the power receiving apparatus 500 is mounted in the portable terminal, a charged state, and the like, under the control of the power transmitting control unit 410 and outputs the generated information request signal to the first and second power transmitting coils 440-1 and 440-2 to the generated information request signal to the power receiving apparatus 500.

The first signal receiving unit 480 receives the signal that is to detect the variation in the load from the first and second power transmitting coils 440-1 and 440-2 and an information signal transmitted by the power receiving apparatus 500 according to the information request signal and provides the received signals to the power transmitting control unit 410.

The power receiving apparatus 500 may include a power charging control unit 510, a power receiving coil 520, a rectifying unit 530, a charging unit 540, a battery cell module 550, a second signal receiving unit 560, a second signal transmitting unit 570, and the like.

The power charging control unit 510 performs a control to generate the information signal such as the ID signal, whether or not the power receiving apparatus 500 is mounted in the portable terminal, the charged state signal, and the like, according to the information request signal transmitted by the wireless power transmitting apparatus 400 to transmit the information signal to the wireless power transmitting apparatus 400. In addition, the power charging control unit 510 performs a control to receive the power transmitted by the wireless power transmitting apparatus 400 to charge the power in the battery cell module 550.

The power receiving coil 520 is coupled to the first and second power transmitting coils 440-1 and 440-2 of the wireless power transmitting apparatus 400 in an electromagnetic induction scheme to receive the information request signal transmitted from the wireless power transmitting apparatus 400 and transmit the information signal to the wireless power transmitting apparatus 400. In addition, the power receiving coil 520 receives the power wirelessly transmitted by the power transmitting coils 440-1 and 440-2 of the wireless power transmitting apparatus 400.

The rectifying unit 530 rectifies the power received by the power receiving coil 520 to convert the power into the DC power.

The charging unit 540 charges the DC power rectified by the rectifying unit 530 in the battery cell module 550 according to the control of the power charging control unit 510.

The second signal receiving unit 560 receives the information request signal transmitted by the wireless power transmitting apparatus 400 through the power receiving coil 520 and provides the received information request signal to the power receiving control unit 510.

The second signal transmitting unit 570 generates the information signal such as the ID signal, whether or not the power receiving apparatus 500 is mounted in the portable terminal, the charged state signal, and the like, under the control of the power receiving control unit 510 and transmits the generated information signal to the wireless power transmitting apparatus 400 through the power receiving coil 520.

The wireless power transmitting apparatus 400 according to the exemplary embodiment of the present invention having the above-mentioned configuration is normally operated by converting the external AC power into the DC power in the AC to DC converter 300 and using the converted DC power as the operation power.

In this state, the wireless power transmitting apparatus 400 should first judge whether or not the power receiving apparatus 500 may receive the power.

That is, the wireless power transmitting apparatus 400 should judge whether or not the power receiving coil 520 of the power receiving apparatus 500 has been positioned on the power transmitting coils 440-1 and 440-2.

To this end, the power transmitting control unit 410 first controls the switching driving unit 450 to connect both of the switches 460-1 and 460-2.

In addition, the power transmitting control unit 410 controls the driving driver 420 to generate the driving signal that is to detect the variation in the load, and the series resonant converter 430 switches the DC power according to the generated driving signal to generate the driving signal that is to detect the variation in the load.

The signal that is to detect the variation in the load generated by the series resonant converter 430 is applied to the first and second power transmitting coils 440-1 and 440-2 through the switches 460-1 and 460-2.

Here, the signal that is to detect the variation in the load is a signal having a frequency at which resonance is not generated in the first and second power transmitting coils 440-1 and 440-2, for example, an AC power having a high frequency of about 180 kHz.

Therefore, even though the series resonant converter 430 switches the DC power to generate the signal that is to detect the variation in the load, the first and second power transmitting coils 440-1 and 440-2 do not resonate, such that power consumption is very low and the power is not wirelessly transmitted.

In this state, the first signal receiving unit 480 receives the signal that is to detect the variation in the load from the first and second power transmitting coils 440-1 and 440-2 and inputs the signal in the power transmitting control unit 410.

The power transmitting control unit 410 judges whether or not the variation in the load has been generated using a frequency of the signal input from the first signal receiving unit 480.

That is, in the case in which the power receiving apparatus 500 is not put on the first and second transmitting coils 440-1 and 440-2, the frequency of the signal that is to detect the variation in the load is not varied.

However, in the case in which the power receiving apparatus 500 is put on the first and second power transmitting coils 440-1 and 440-2, mutual impedance, or the like, is generated between the first and second power transmitting coils 440-1 and 440-2 and the power receiving coil 520, such that the frequency of the signal that is to detect the variation in the load is varied.

The power transmitting control unit 410 judges whether or not the frequency of the signal that is to detect the variation in the load input from the first signal receiving unit 480 has been varied and judges that the load has been varied in the case in which the frequency is varied.

When it is judged that the load has been varied, the power transmitting control unit 410 controls the first signal transmitting unit 470 to generate the information request signal requesting the information such as the ID of the power receiving apparatus 500, whether or not the power receiving apparatus 500 is mounted in the portable terminal, the charged state in which the power is currently charged in the battery cell module 550, and the like. The generated information request signal is transmitted to the power receiving apparatus 500 through the first and second power transmitting coils 440-1 and 440-2.

The transmitted information request signal is received by the second signal receiving unit 560 through the power receiving coil 520 of the power receiving apparatus 500, and the received information request signal is input to the power charging control unit 510.

In this case, the power charging control unit 510 controls the second signal transmitting unit 570 according to the information request signal to generate the ID signal, a signal indicating whether or not the power receiving apparatus 500 is mounted in the portable terminal, a signal indicating the charged state in which the power is currently charged in the battery cell module 550, and the like, and the generated information signal is transmitted to the wireless power transmitting apparatus 400 through the power receiving coil 520.

In the wireless power transmitting apparatus 400, the first signal receiving unit 480 receives the information signal transmitted by the power receiving apparatus 500 through the first and second power transmitting coils 440-1 and 440-2 to input the information signal to the power transmitting control unit 410.

The power transmitting control unit 410 judges that the power receiving apparatus 500 has been put on the first and second power transmitting coils 440-1 and 440-2 using the information signal input from the first signal receiving unit 480.

Here, the power transmitting control unit 410 judges whether the power receiving apparatus 500 has been put at an upper position of the first power transmitting coil 440-1, an upper position of the second power transmitting coil 440-2, or an upper position of an overlapped region at which the first and second power transmitting coils 440-1 and 440-2 are overlapped with each other according to whether the information signal has been received through the first power transmitting coil 440-1 or the second power transmitting coil 440-2.

Here, it is assumed that the power receiving apparatus 500 is put on the first power transmitting coil 440-1, such that the information signal is received through the power transmitting coil 440-1.

In the case in which the information signal is received through the first power transmitting coils 440-1, the power transmitting control unit 410 controls the driving driver 410 to generate the driving signal that is to transmit the power, the series resonant converter 430 switches the DC power according to the generated driving signal that is to transmit the power, and the switched power is applied to the first power transmitting coil 440-1 through the switch 460-1 to generate resonance in the first power transmitting coil 440-1.

For example, the first power transmitting coil 440-1 is designed to resonates at 100 kHz, the series resonant converter 430 switches the DC power according to the driving signal that is to drive the power to generate the AC power having a frequency of 100 kHz, and the AC power having the frequency of 100 kHz is applied to the first power transmitting coil 440-1 to generate the resonance in the first power transmitting coil 440-1.

When the resonance is generated in the first power transmitting coil 440-1, a large amount of current flows in the first power transmitting coil 440-1, such that the power is wirelessly transmitted.

The power receiving coil 520 of the power receiving apparatus 500 receives the power transmitted by the first power transmitting coil 440-1, the rectifying unit 530 converts the received power into the DC power, and the charging unit 540 charges the converted DC power in the battery cell module 550 under the control of the power charging control unit 510.

In addition, the power charging control unit 510 judges the power charged state of the battery cell module 550 and controls the second signal transmitting unit 570 according to the judged power charged state to generate the charged state signal, which is transmitted to the wireless power transmitting apparatus 400 through the power receiving coil 520.

The first signal receiving unit 480 of the wireless power transmitting apparatus 400 receives the charged state signal from the first power transmitting coil 440-1 and outputs the received charged state signal to the power transmitting control unit 410, and the power transmitting control unit 410 judges a power charged amount of the power receiving apparatus 500 using the charged state signal.

As described above, in the state in which the power is wirelessly transmitted through the first power transmitting coil 440-1, the power transmitting control unit 410 controls the driving driver 420 to apply the signal that is to detect the variation in the load to the second power transmitting coil 440-2 and judge whether or not the variation in the load has been generated.

In the case in which it is judged that the variation in the load of the second power transmitting coil 440-2 has been generated, the power transmitting control unit 410 controls the first signal transmitting unit 470 to generate the information request signal requesting the information such as the ID of the power receiving apparatus 500, whether or not the power receiving apparatus 500 is mounted in the portable terminal, the charged state in which the power is currently charged in the battery cell module 550, and the like, as described above. The generated information request signal is transmitted to the power receiving apparatus 500, and the information signal according to the information request signal is received from the power receiving apparatus 500 through the second power transmitting coil 440-2.

In this state, the power transmitting control unit 410 judges the priorities of the power receiving apparatus 500 put on the first power transmitting coil 440-1 and the power receiving apparatus 500 put on the second power transmitting coil 440-2.

Here, the priorities may be allocated in a scheme in which a first priority is allocated to the power receiving apparatus 500 that is mounted in the portable terminal and a second priority is allocated to the power receiving apparatus 500 that is not mounted in the portable terminal.

Further, in the case in which the priorities of the power receiving apparatuses 500 put on the first and second power transmitting coils 440-1 and 440-2 are the same as each other, that is, in the case in which both of the two power receiving apparatuses are mounted in the portable terminals or are not mounted in the portable terminals, the power transmitting control unit 410 judges the priorities using the power charged state of each of the two power receiving apparatuses 500.

The priorities according to the power charged state may be allocated in scheme in which a first priority is allocated to the power receiving apparatus 500 having a large power charged amount and a second priority is allocated to the power receiving apparatus 500 having a small power charged amount.

The priorities according to the power charged state may also be allocated in a scheme in which a first priority is allocated to the power receiving apparatus 500 having a small power charged amount and a second priority is allocated to the power receiving apparatus 500 having a large power charged amount.

Here, it is preferable to allow the user to preset the priorities according to the power charged state.

Here, an operation will be described on the assumption that the priority of the power receiving apparatus 500 put on the first power transmitting coil 440-1 is high and the priority of the power receiving apparatus 500 put on the second power transmitting coil 440-2 is low.

In the case in which the priority of the power receiving apparatus 500 put on the first power transmitting coil 440-1 is high, the power transmitting control unit 410 transmits the power through the first power transmitting coil 440-1 to charge the power in the power receiving apparatus 500 put on the first power transmitting coil 440-1 and receives the charged state information to judge whether or not the power receiving apparatus 500 put on the first power transmitting coil 440-1 has been fully charged.

In this state, when it is judged that the power receiving apparatus 500 put on the first power transmitting coil 440-1 has been fully charged, the power transmitting control unit 410 transmits the power through the second power transmitting coil 440-2 to charge the power in the power receiving apparatus 500 put on the second power transmitting coil 440-2, receives the charged state information to judge whether or not the power receiving apparatus 500 put on the second power transmitting coil 440-2 has been fully charged, and ends an operation of transmitting the power in the case in which it is judged that the power receiving apparatus 500 put on the second power transmitting coil 440-2 has been fully charged.

Figure 3A:
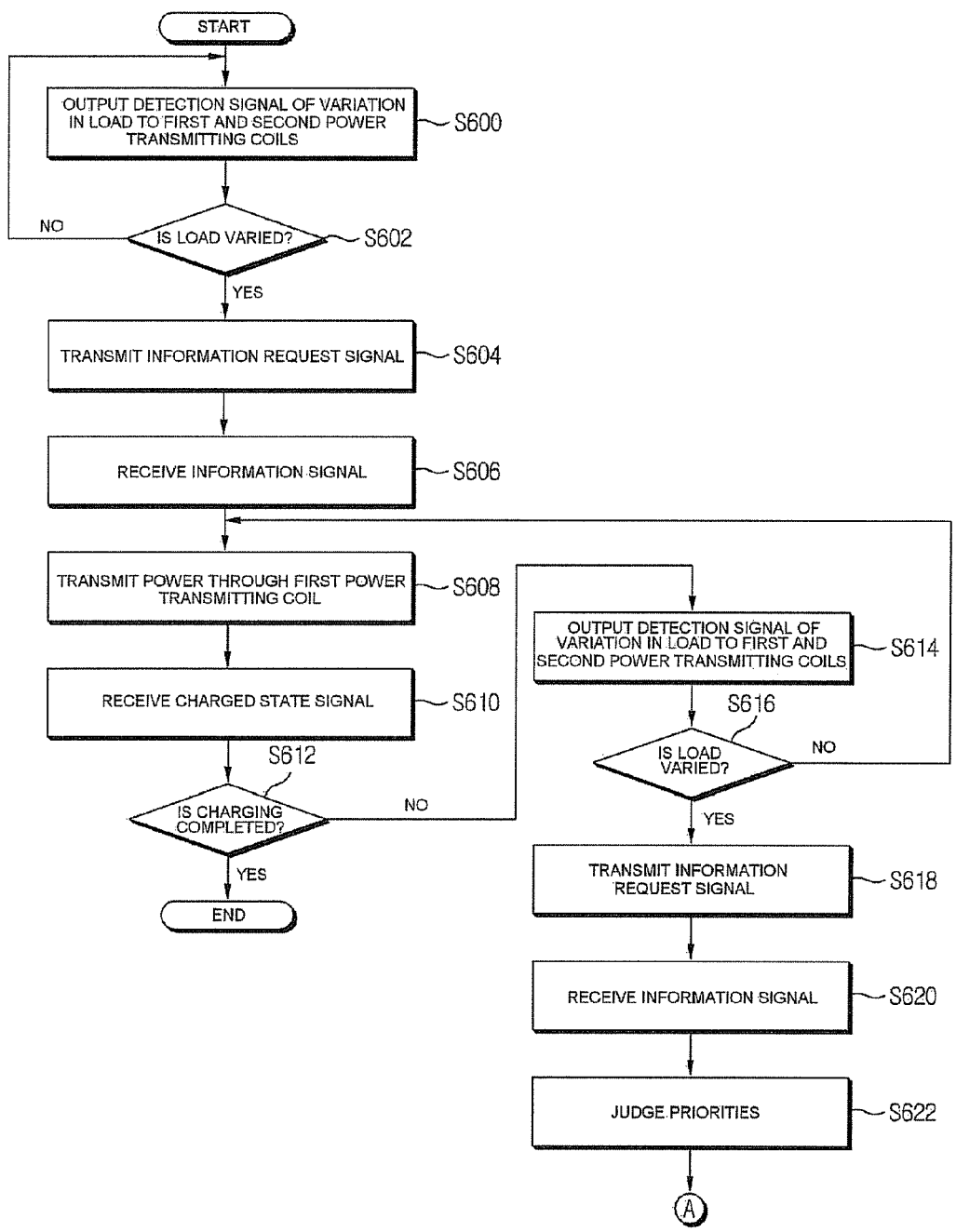
FIGS. 3A and 3B are signal flow charts showing an operation of a power transmitting control unit in the wireless power transmitting apparatus according to the exemplary embodiment of the present invention.
Figure 3B:
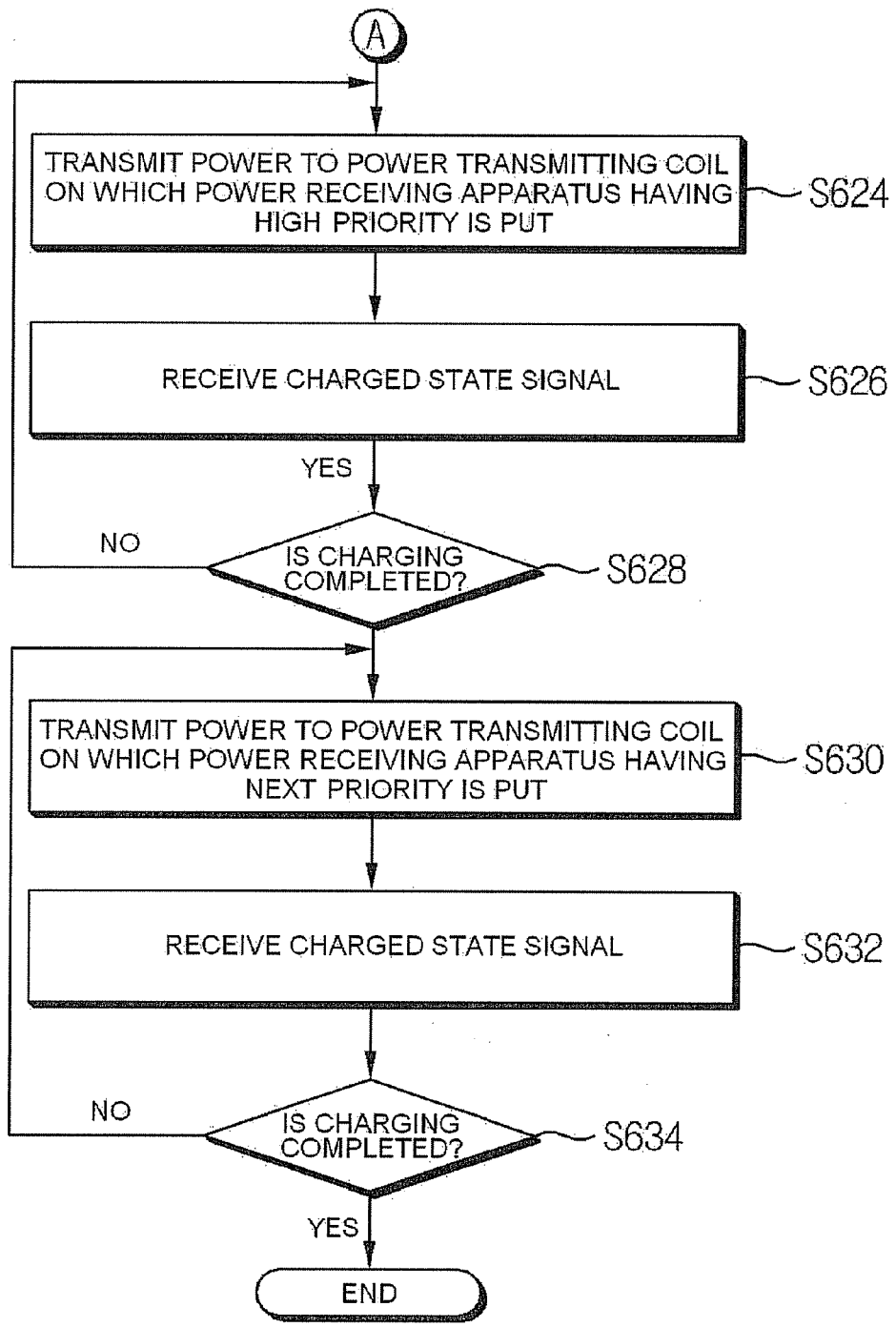

FIGS. 3A and 3B are signal flow charts showing an operation of a power transmitting control unit in the wireless power transmitting apparatus according to the exemplary embodiment of the present invention. Referring to FIG. 3A, the power transmitting control unit 410 controls the driving driver 420 in the state in which it controls the switching driving unit 450 to connect the switches 460-1 and 460-2, thereby allowing the signal that is to detect the load to be output to the first and second power transmitting coils 440-1 and 440-2 (S600).

In this state, the power transmitting control unit 410 inputs a received signal of the first signal receiving unit 480 to judge whether or not the variation in the load has been generated (S602).

In the case in which it is judged that the variation in the load has been generated, the power transmitting control unit 410 controls the first signal transmitting unit 470 to generate the information request signal and transmits the generated information request signal to the power receiving apparatus 500 through the first and second power transmitting coils 440-1 and 440-2 (S604).

Then, the power transmitting control unit 410 receives the information signal transmitted by the power receiving apparatus 500 according to the information request signal (S606).

Here, it is assumed that the information signal has been received through the first power transmitting coil 440-1.

In the case in which the information signal is received through the first power transmitting coil 440-1, the power transmitting control unit 410 judges that the power receiving apparatus 500 has been put on the first power transmitting coil 440-1 and controls the driving driver 420 to transmit the power through the power transmitting coil 440-1 (S608).

In addition, the power transmitting control unit 410 receives the charged state signal from the power receiving apparatus 500 (S610) and judges whether or not the charging of the power receiving apparatus 500 has been completed (S612).

In the case in which it is judged that the charging of the power receiving apparatus 500 has been completed, the power transmitting control unit 410 ends the operation of transmitting the power.

Meanwhile, in the case in which it is judged that the charging of the power receiving apparatus 500 has not been completed, the power transmitting control unit 410 controls the driving driver 420 to output the signal that is to detect the variation in the load to the second power transmitting coil 440-2 (S614) and judge whether or not the variation in the load has been generated (S616).

In the case in which it is judged in step (S616) that the variation in the load has not been generated, the power transmitting control unit 410 returns to step (S608) to repeatedly perform an operation of transmitting the power through the first power transmitting coil 440-1, receiving the charged state signal to judge whether or not the charging has been completed, and outputting the signal that is to detect the variation in the load to the second power transmitting coil 440-2 to judge whether or not the variation in the load has been generated in the case in which it is judged that the charging has not been completed.

In this state, when the variation in the load of the second power transmitting coil 440-2 is detected, the power transmitting control unit 410 controls the first signal transmitting unit 470 to transmit the information request signal (S618) and receives the information signal transmitted by the power receiving apparatus 500 (S620).

Then, the power transmitting control unit 410 judges the priorities of the power receiving apparatus 500 put on the first power transmitting coil 440-1 and the power receiving apparatus 500 put on the second power transmitting coil 440-2 (S622).

Here, an operation will be described on the assumption that the priority of the power receiving apparatus 500 put on the first power transmitting coil 440-1 is high.

Referring to FIG. 3B, in the case in which the priorities are judged, the power transmitting control unit 410 control the driving driver 420 to transmit the power to the first power transmitting coil 440-1 on which the power receiving apparatus 500 having a high priority is put (S624), receives the charged state signal from the power receiving apparatus 500 put on the first power transmitting coil 440-1 (S626), and judges whether or not the charging of the power receiving apparatus 500 put on the first power transmitting coil 440-1 has been completed using the received charged state signal (S628).

In the case in which it is judged that the charging of the power receiving apparatus 500 put on the first power transmitting coil 440-1 has not been completed, the power transmitting control unit 410 returns to step (S624) to repeatedly perform an operation of judging whether or not the charging of the power receiving apparatus 500 has been completed while continuously transmitting the power through the first power transmitting coil 440-1.

In this state, in the case in which it is judged that the charging of the power receiving apparatus 500 put on the first power transmitting coil 440-1 has been completed, the power transmitting control unit 410 transmits the power through the second power transmitting coil 440-2 on which the power receiving apparatus 500 having the next priority is put, receives the charged state signal from the power receiving apparatus 500 put on the second power transmitting coil 440-2 (S632), and judges whether or not the charging of the power receiving apparatus 500 put on the second power transmitting coil 440-2 has been completed using the received charged state signal (S634).

In the case in which it is judged in step (S634) that the charging of the power receiving apparatus 500 put on the second power transmitting coil 440-2 has not been completed, the power transmitting control unit 410 returns to step (S630) to repeatedly perform an operation of judging whether or not the charging of the power receiving apparatus 500 has been completed while continuously transmitting the power through the second power transmitting coil 440-2.

Meanwhile, in the case in which it is judged in step (S634) that the charging of the power receiving apparatus 500 put on the second power transmitting coil 440-2 has been completed, the power transmitting control unit 410 ends the operation of transmitting the power.

With the wireless power transmitting apparatus and method according to the exemplary embodiments of the present invention, in the case in which the plurality of power receiving apparatuses are put on the charging station, the priorities of the plurality of power receiving apparatuses are judged and the power is sequentially supplied to and charged in the plurality of power receiving apparatuses according to the judged priorities.

Therefore, after the charging of the power receiving apparatus required to be urgently charged is completed, the power is charged in the power receiving apparatus not required to be urgently charged, thereby making it possible to very efficiently charge the power in the plurality of power receiving apparatuses and fully charge the power in the plurality of power receiving apparatuses at a very rapid speed.

In addition, the power may be automatically charged sequentially in the plurality of power receiving apparatuses using one wireless power transmitting apparatus without movement of the power transmitting coil or an additional operation of the user.

Although a few embodiments of the present invention have been shown and described, it would be appreciated by those skilled in the art that changes may be made in this embodiment without departing from the principles and spirit of the invention, the scope of which is defined in the claims and their equivalents.

Accordingly, the scope of the present invention is not construed as being limited to the described embodiments but is defined by the appended claims as well as equivalents thereto.

What is claimed is:

1. A wireless power transmitting apparatus comprising:
   a power transmitting unit configured to wirelessly transmit a power through a plurality of power transmitting coils; and
   a power transmitting control unit configured to perform a control to judge priorities of a plurality of power receiving apparatuses charged with the power transmitted by the power transmitting unit in the case in which the number of power receiving apparatuses is plural, sequentially select the plurality of power receiving apparatuses one by one according to the judged priorities, and transmit the power to the selected power receiving apparatuses,
   wherein the power transmitting unit includes:
   a signal transmitting unit configured to generate information request signal requesting information of identifications (IDs) of the plurality of power receiving apparatuses, information on whether or not the plurality of power receiving apparatuses are mounted in portable terminals and information on power charged states under the control of the power transmitting control unit, and configured to transmit the information request signal to the plurality of power receiving apparatuses; and
   a signal receiving unit configured to receive information signal transmitted by the power receiving apparatuses according to the information request signal and configured to provide the information signal to the power transmitting control unit.

2. The wireless power transmitting apparatus of claim 1, wherein the transmission of the information request signal and the reception of the information signal are performed through the plurality of power transmitting coils.

3. The wireless power transmitting apparatus of claim 1, wherein the priorities are allocated in a scheme in which a first priority is allocated to the power receiving apparatus that is mounted in the portable terminal and a second priority is allocated to the power receiving apparatus that is not mounted in the portable terminal.

4. The wireless power transmitting apparatus of claim 3, wherein in the case in which the priorities according to the information on whether or not the power receiving apparatuses are mounted in the portable terminals are the same as each other, the priorities are determined according to the power charged states of the power receiving apparatuses.

5. The wireless power transmitting apparatus of claim 1, wherein the power transmitting unit includes:
   a driving driver configured to generate a driving signal that is to detect a variation in a load and a driving signal that is to transmit under the control of the power transmitting control unit; and a series resonant converter configured to switch a direct current (DC) power according to the driving signal to output the switched DC power to the plurality of power transmitting coils.

6. The wireless power transmitting apparatus of claim 5, wherein the power transmitting unit includes:
a switching driving unit configured to generate a switching driving signal under the control of the power transmitting control unit; and
a plurality of switches each provided between the series resonant converter and the plurality of power transmitting coils and configured to be switched the switching driving signal.

7. A wireless power transmitting method comprising:
generating, in a signal transmitting unit, information request signal requesting information of identifications (IDs) of power receiving apparatuses, information on whether or not the power receiving apparatuses are mounted in portable terminals and information on power charged states under a control of a power transmitting control unit in the case in which loads of a plurality of power transmitting coils are varied;
transmitting the information request signal to the power receiving apparatuses;
receiving information signal according to the information request signal from the power receiving apparatuses;
judging, in the power transmitting control unit, priorities using the information signal in the case in which the number of power receiving apparatuses is plural; and
sequentially selecting, in the power transmitting control unit, the plurality of power receiving apparatuses one by one according to the priorities and transmitting the power to the selected power receiving apparatuses.

8. The wireless power transmitting method of claim 7, wherein the priorities are allocated in a scheme in which a first priority is allocated to the power receiving apparatus that is mounted in the portable terminal and a second priority is allocated to the power receiving apparatus that is not mounted in the portable terminal.

9. The wireless power transmitting method of claim 8, wherein in the case in which the priorities according to whether or not the power receiving apparatuses are mounted in the portable terminals are the same as each other, the priorities are determined according to the power charged states of the power receiving apparatuses.

* * * * *